United States Patent [19]

Knop et al.

[11] Patent Number: 4,484,797

[45] Date of Patent: Nov. 27, 1984

[54] DIFFRACTIVE SUBTRACTIVE COLOR FILTER RESPONSIVE TO ANGLE OF INCIDENCE OF POLYCHROMATIC ILLUMINATING LIGHT

[75] Inventors: Karl H. Knop, Zurich; Rudolf H. Morf, Winterthur, both of Switzerland

[73] Assignee: RCA Corporation, New York, N.Y.

[21] Appl. No.: 387,614

[22] Filed: Jun. 11, 1982

[30] Foreign Application Priority Data

Jul. 20, 1981 [GB] United Kingdom ............... 8122335
Sep. 17, 1981 [GB] United Kingdom ............... 8128194

[51] Int. Cl.³ .................................................. G02B 5/18
[52] U.S. Cl. .................................. 350/162.19; 283/91; 283/902; 350/162.2; 350/162.21
[58] Field of Search ........................... 283/91, 902; 350/162.17, 162.19, 162.2, 162.21, 162.24

[56] References Cited

U.S. PATENT DOCUMENTS

| | | | |
|---|---|---|---|
| 3,542,453 | 11/1970 | Kantor | 350/162.16 |
| 3,623,794 | 11/1971 | Brown | 350/162.19 |
| 3,759,604 | 9/1973 | Thelen | 350/166 |
| 3,858,977 | 1/1975 | Baird et al. | 350/166 |
| 3,911,479 | 10/1975 | Sakurai | 350/162.2 |
| 3,957,354 | 5/1976 | Knop | 350/162.19 |
| 4,029,394 | 6/1977 | Araki | 350/166 |
| 4,057,326 | 11/1977 | Knop | 350/162.19 |
| 4,130,347 | 12/1978 | Knop | 350/162.19 |
| 4,155,627 | 5/1979 | Gale et al. | 350/162.19 |
| 4,255,019 | 3/1981 | Knop | 350/162.2 |
| 4,277,138 | 7/1981 | Dammann | 350/162.17 |
| 4,400,057 | 8/1983 | Moraw et al. | 350/162.2 |

*Primary Examiner*—Bruce Y. Arnold
*Assistant Examiner*—William Propp
*Attorney, Agent, or Firm*—Joseph S. Tripoli; George E. Haas; George J. Seligsohn

[57] ABSTRACT

A variable index-of-refraction optical medium of certain minimum thickness and periodicity with respect to the wavelength of incident light—if it meets certain specified constraints with respect to (1) relative indices-of-refraction of both its internal structure and that of its surroundings and (2) relative values of incident wavelength to periodicity and the relative indices-of-refraction—operates to produce both angularly-dependent subtractive-color filter reflection spectra and subtractive-color filter transmission spectra in accordance with its physical parameters. Such filters are suitable for use as authenticating devices for sheet-material authenticated items.

33 Claims, 21 Drawing Figures

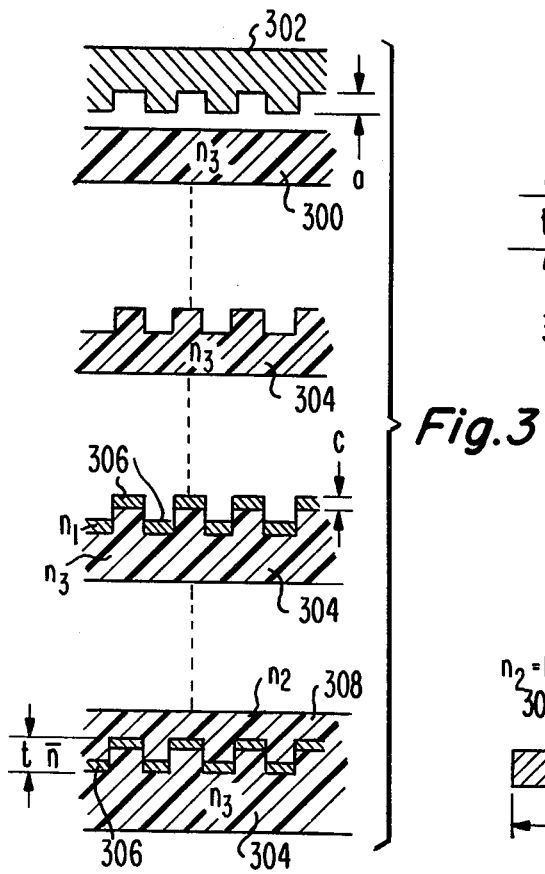
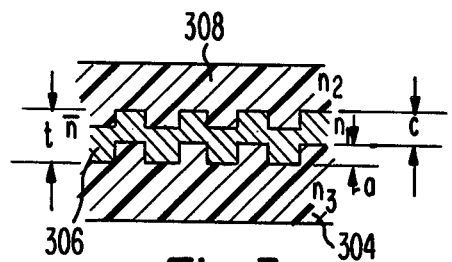
*Fig. 3a*
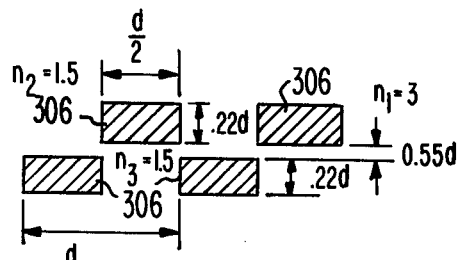
*Fig. 3b*
*Fig. 3*
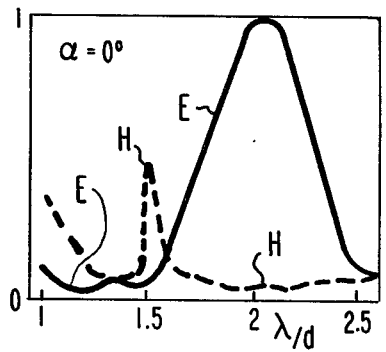
*Fig. 3c*
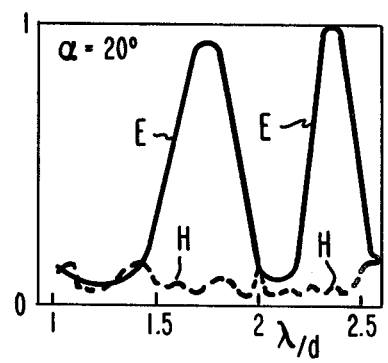
*Fig. 3d*
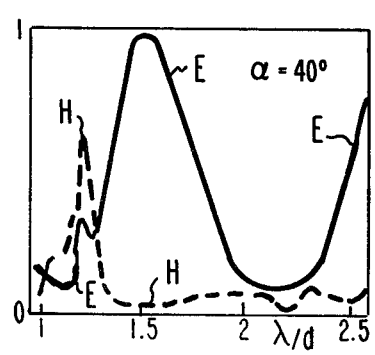
*Fig. 3e*

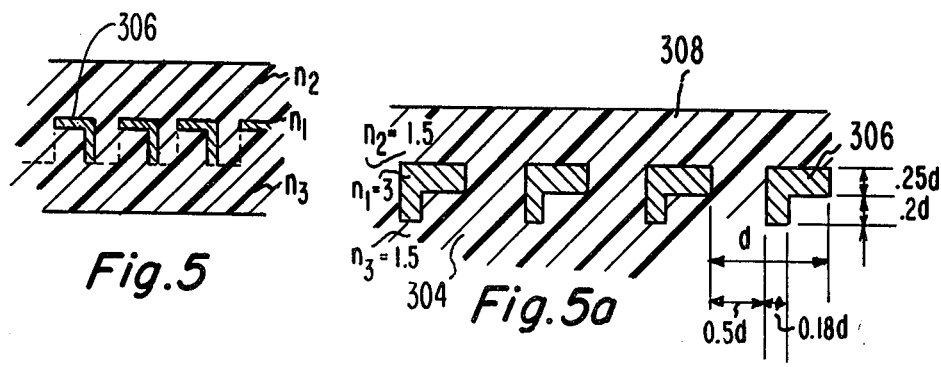
Fig.5
Fig.5a
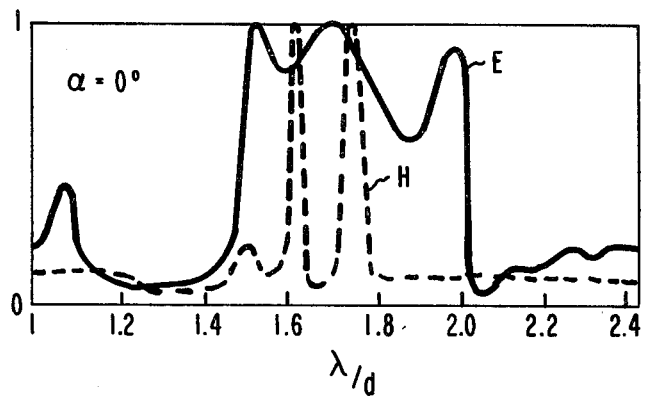
Fig.5b
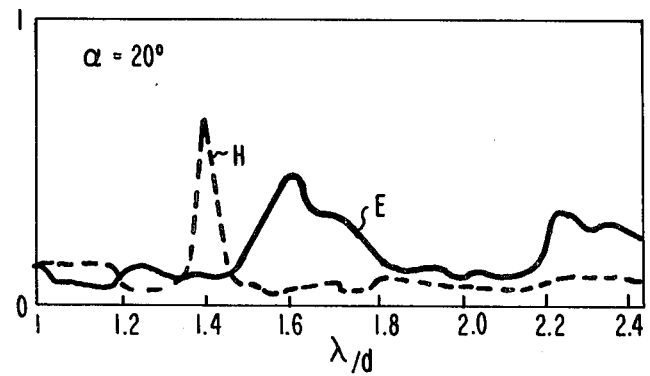
Fig.5c

DIFFRACTIVE SUBTRACTIVE COLOR FILTER RESPONSIVE TO ANGLE OF INCIDENCE OF POLYCHROMATIC ILLUMINATING LIGHT

This invention relates to diffractive subtractive color filters and, more specifically, to a new type of diffractive subtractive color filter which is particularly suitable for use as an authenticating device for an authenticated item comprised of sheet material.

Reference is made to U.S. Pat. No. 3,957,354, which issued May 18, 1976 to Knop, and is assigned to the same assignee as the present invention. This patent, which relates to a diffractive subtractive color filtering technique, employs a diffracting phase medium (which may be transmissive or reflective) illuminated by polychromatic (e.g., white) light to segregate zero diffraction order output light from higher diffraction order output light. The zero diffraction order output light is subtractively color filtered to possess color characteristics determined by such parameters as the effective optical peak amplitude and the waveform profile of spatially distributed diffraction elements of the diffracting phase medium. The aggregate of the higher diffraction orders possess color characteristics which are the complement of the zero diffraction order. As discussed in this patent, diffractive subtractive color filters, which employ no dyes, may be used in the projection of color pictures. In this case, the zero diffraction order may be projected through an aperture which is sufficiently wide to admit the zero diffraction order, but not wide enough to admit any of the higher diffraction orders.

Reference is further made to co-pending U.S. patent application Ser. No. 235,970, which was filed by Webster et al on Feb. 19, 1981, and is assigned to the same assignee as the present invention. This patent application describes a sheet-material authenticating item with a reflective diffractive authenticating device, which uses a reflective (rather than transmissive) diffractive color filter, of a type disclosed in U.S. Pat. No. 3,957,354, to authenticate various items of sheet-materials which are subject to counterfeiting. Such items include bank notes and other valuable documents, credit cards, passports, security passes and phonograph records for their covers, for example. Such an authenticating device prevents would-be counterfeiters from employing advanced photocopying machines for the color copying of documents. Such color copying machines, now or at least in the near future, would be capable of providing such high fidelity color copies that a non-expert would find it very difficult, if not impossible, to discriminate between a counterfeit and a genuine article. The basic requirement for an authenticating device attached to an authenticated item is that the authenticating device possess a distinctive characteristic that is not capable of being photocopied. Additional requirements are that the distinctive characteristic be easily recognized by the man-in-the-street; that the technical sophistication and capital cost needed to fabricate authenticating devices be high, and that the variable cost per unit plus the amortization of the high capital cost per unit be sufficiently low as not to be an impediment to its use.

As brought out in the aforesaid co-pending patent application, a reflective diffractive subtractive color filter meets all these requirements. Such a filter has the characteristic of producing angularly-separated reflected diffraction orders of different colors in response to the illumination thereof by polychromatic light. Such a characteristic cannot be copied by a photocopying machine. By merely tilting the authenticated item, angular separation between the zero and first orders and the angular width of each order are sufficiently large to provide a difference in color hue that is easily discernable by a man-in-the-street. Furthermore, such a diffractive structure requires high sophistication and a high capital cost to make an original embossing master, which then can be replicated by embossing the diffractive structure in plastic film. This replication technique permits low unit cost to be achieved in the fabrication of reflective diffractive authenticating devices.

The present invention is directed to a new type of diffractive subtractive color filter that exhibits unusual optical characteristics in both reflection and transmission. In reflection, the diffractive subtractive color filter of the present invention operates as a colored mirror, in which the color of the mirror varies with the viewing angle. Like any other mirror, the viewing angle is an angle of reflection in which the reflected light at that viewing angle depends on the light incident on the mirror at an angle of incidence equal to that angle of reflection but is totally independent of any light incident on the mirror at any angle of incidence unequal to the angle of reflection of that viewing angle. Therefore, by way of one example, the colored mirror of the present invention may appear as a red mirror when viewed at a normal angle to the surface of the filter, but as a green mirror when viewed at an angle of 20° with respect to the normal to the surface. In the special case of non-absorptive structures the color characteristics of this novel diffractive subtractive color filter in transmission are the complement of those in reflection. Therefore, the color characteristics in transmission also show an angular dependence. These angularly dependent color characteristics, in both reflection and transmission, are specifically determined by the respective values of certain physical parameters of the diffractive structure comprising the novel diffractive subtractive color filter of the present invention. Although its use is not limited thereto, the diffractive subtractive color filter of the present invention can be used to great advantage as a reflective diffractive authenticating device in accordance with the teaching of the aforesaid co-pending patent application.

More specifically, the present invention is concerned with a diffractive subtractive color filter responsive to polychromatic illuminating light having a given wavelength spectrum incident thereon for deriving reflection spectra which vary as a function of the angle of incidence and polarization of the illuminating light. The diffractive subtractive color filter also derives transmission spectra which are substantially (in the special case of non-absorptive structures exactly) the complement of the reflection spectra. Structurally, the filter comprises a first optical medium having a thickness t between two opposite faces thereof. The first optical medium has a varying index-of-refraction which divides the first optical medium into juxtaposed periodic diffraction elements of a diffractive structure having a period d which extends in a direction substantially parallel to the faces and perpendicular to a given direction. Therefore, each one of the diffraction elements extends along a direction substantially parallel to the faces and parallel to the given direction. Furthermore, the spatial distribution of the varying index-of-refraction within the volume of each diffraction element divides that diffraction element into a plurality of separate three-dimensional regions of certain-valued indices-of-refraction, which include one or more regions of relatively higher index-of-refraction and one or more regions of relatively lower index-of-refraction. Each of the regions has a specified size and shape, whereby the entire volume of each diffraction element has an average index-of-refraction n. This array of diffracting elements is normally embedded between a second optical medium with refractive index $n_2$ and a third optical medium with refractive index $n_3$.

Let us define the spectral range of interest extending from a minimum wavelength $\lambda_1$ up to a maximum wavelength $\lambda_2$. This spectral range may lie in the visible range (0.4 $\mu m \leq \lambda \leq$ 0.7 $\mu m$) or anywhere else in the electromagnetic spectrum. By the term wavelength we mean the free-space wavelength (it is assumed that the wavelength in air is substantially the free-space wavelength). The structures to be described below satisfy the following relationships.

$$\bar{n} > \max(n_2, n_3) \tag{1}$$

$$d \max(n_2, n_3) < \lambda_2 \tag{2}$$

$$d(\bar{n}+1) > \lambda_1 \tag{3}$$

$$4\bar{n}t \geq \lambda_1 \tag{4}$$

where $\max(n_2, n_3)$ is generally the larger of $n_2$ and $n_3$, but, in the special case where $n_2 = n_3$, is $n_2$ or $n_3$. The result is that the characteristics of each of the spectra depends on (1) the angle of incidence of the illuminating light, (2) the specified size and shape of each of the regions of the certain-valued relatively higher and relatively lower indices-of-refraction (which, in turn, determine the value of $\bar{n}$), and (3) the respective physical values of d and t.

In the drawings:

FIG. 3 is a flow chart showing the steps for fabricating a first practical example of the diffractive structure shown generally in FIG. 1;

FIG. 3a illustrates a first modification of the example of FIG. 3;

Figure 4:
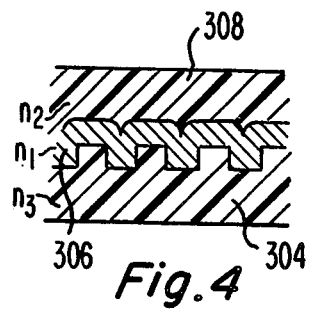
Figure 4A:
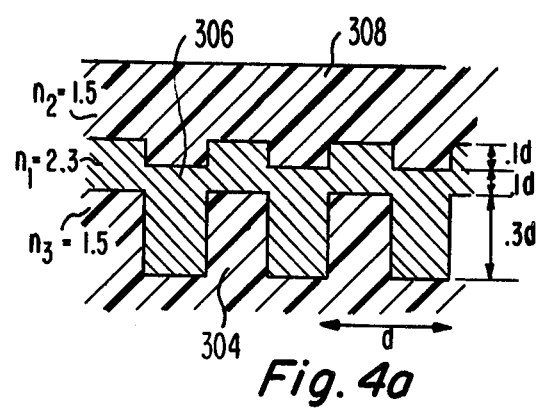
Figure 4B:
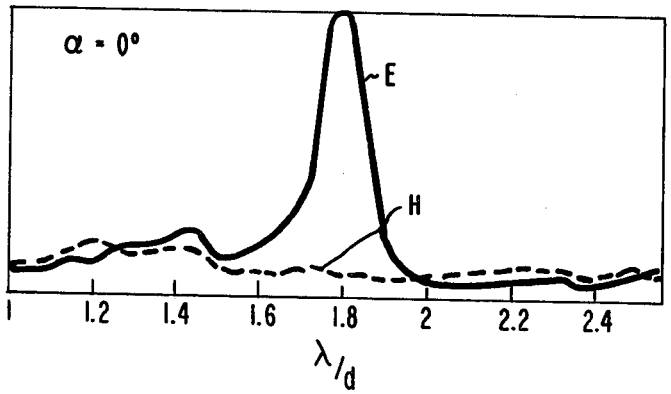
Figure 4C:
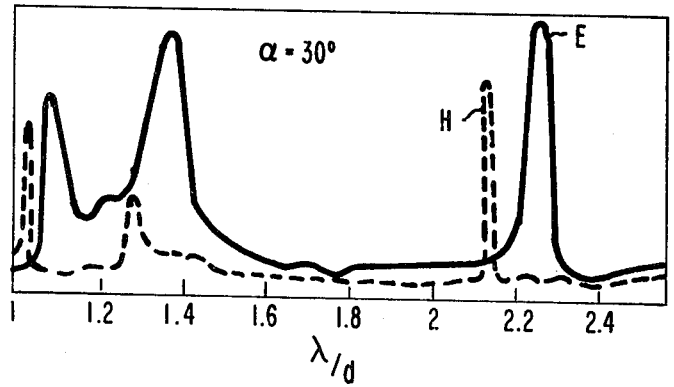
Figure 6A:
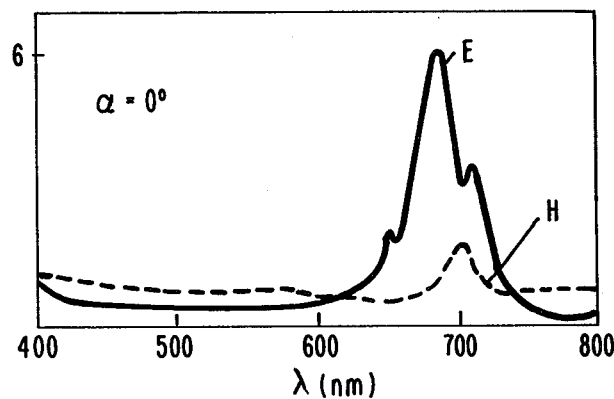
Figure 6B:
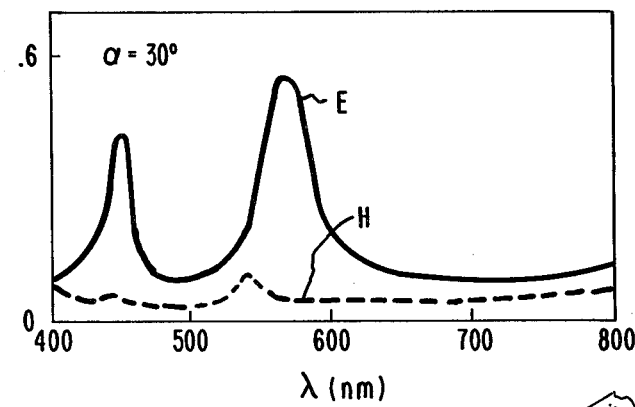
Figure 7:
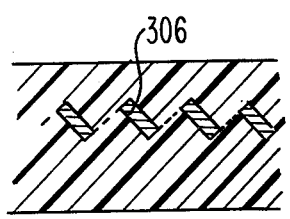
Figure 8:
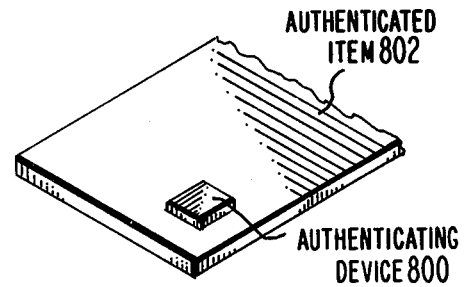
Figure 9:
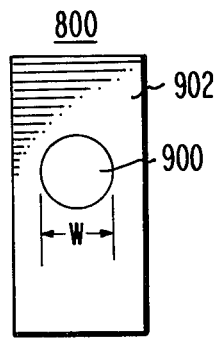

FIG. 3b illustrates, in idealized form, the diffractive structures of FIGS. 3 and 3a, having a predetermined set of relative parameter values, and FIG. 3c, 3d and 3e illustrate, respectively, the zero-order reflection spectra of the structure shown in FIG. 3b for polychromatic illuminating light at angles of incidence of 0°, 20° and 40°;

FIG. 4 illustrates a second modification of a diffractive structure fabricated by the method shown in FIG. 3;

FIG. 4a illustrates, in idealized form, the diffractive structure of FIG. 4, having a predetermined set of relative parameter values, and FIGS. 4b and 4c illustrate, respectively, the zero-order reflection spectra of the structure shown in FIG. 4a for polychromatic illuminating light at angles of incidence of 0° and 30°;

FIG. 5 illustrates a third modification of a diffractive structure fabricated by the method of FIG. 3;

FIG. 5a illustrates, in idealized form, the diffractive structure of FIG. 5 having a predetermined set of relative parameter values, and FIGS. 5b and 5c illustrate, respectively, the zero-order reflection spectra of the structure shown in FIG. 5a for polychromatic illuminating light at angles of incidence of 0° and 20°;

FIGS. 6a and 6b respectively, illustrate the zero-order spectra of an experimental filter, which was actually constructed and had a diffractive structure similar to that shown in FIG. 4, for visible polychromatic illuminating light at angles of incidence of 0° and 30°;

FIG. 7 illustrates a fourth modification of a diffractive structure fabricated by the method shown in FIG. 3; and FIGS. 8 and 9 illustrate uses of a diffractive subtractive color filter incorporating the present invention as an authenticating device for an authenticated item.

The term "light," as used herein, includes visible light having a wavelength spectrum of 0.4–0.7 micrometers, ultraviolet light having wavelength spectrum below 0.4 micrometer, and infra-red light having a wavelength spectrum above 0.7 micrometer. However, although not limited thereto, the present invention is particularly suitable for use with diffuse polychromatic visible (e.g. white) light incident on a diffractive subtractive color filter incorporating the present invention that is simultaneously incident on the filter at all angles of incidence between 0° and 90°.

It is known that obliquely incident light is refracted when it passes the interface between two optical mediums having different indices-of-refraction. However, such refraction effects need not be considered in order to understand the principles of the present invention. Therefore, for the sake of clarity in describing the present invention, refraction effects have been ignored.

The expression "free/space wavelength," as used herein, is meant to include the wavelength in air or the like, as well as a vacuum, since, compared to the index-of-refraction of the materials comprising the filter itself, the difference between the index-of-refraction of the air and that of a vacuum is negligible.

Figure 1:
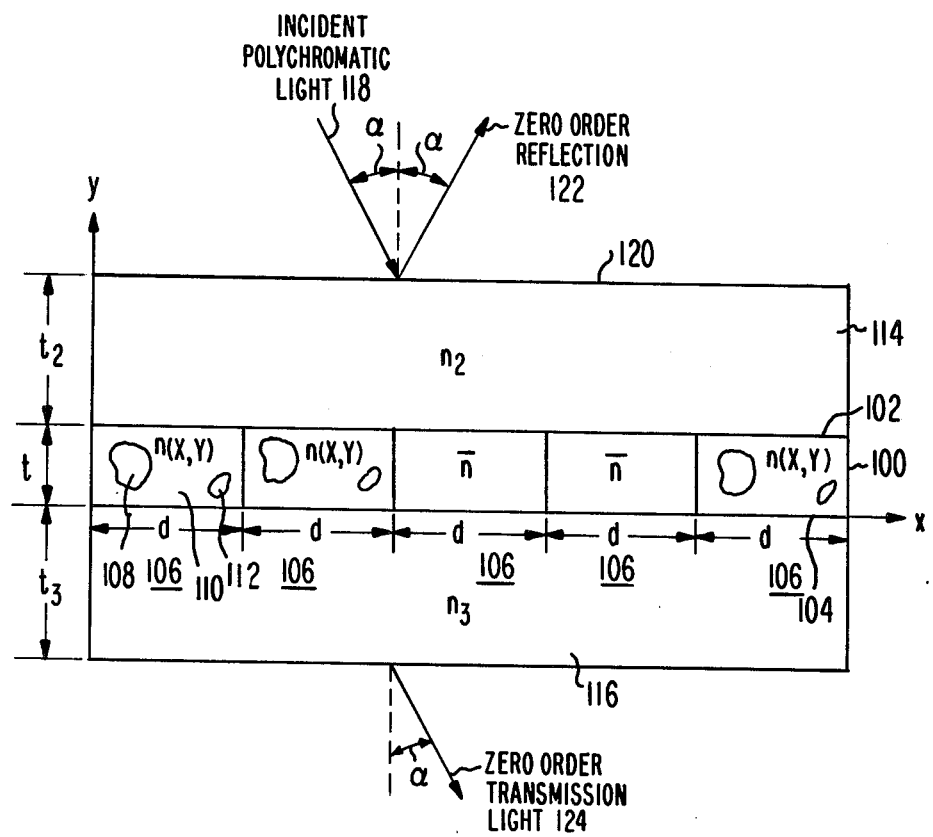
FIG. 1 is a diagram illustrating a generalized embodiment of a diffractive structure incorporating the principles of the present invention.

Referring to FIG. 1, there is shown a first optical medium 100 having a thickess t between two opposite faces 102 and 104 thereof. As shown in FIG. 1, the thickness t extends in a vertical Y direction, and the faces 102 and 104 extend in a horizontal X direction and in a Z direction (not shown) perpendicular to the plane of the paper. Optical medium 100 has a varying index-of-refraction which divides it into juxtaposed periodic diffraction elements 106 having a period d which extends in the X direction. This results in each one of diffraction elements 106 extending along the Z direction (not shown), perpendicular to the plane of the paper. The spatial distribution n (x, y) of the varying index-of-refraction within the volume of each diffraction element 106 divides that diffraction element 106 into a plurality of separate three-dimensional regions (e.g., regions 108, 110 and 112) of certain-valued relatively higher and relatively lower indices-of-refraction. As shown in FIG. 1, each of these regions has a specified size and shape. This results in the entire value of each diffraction element 106 having an average index-of-refraction $\bar{n}$. In FIG. 1, the fine-structure regions 108, 110 and 112 are illustrated for the first, second and last diffraction elements 106, while only the average indexof-refraction $\bar{n}$ is indicated for the third and fourth diffraction elements 106. It should be understood, however, that both the fine-structure and the average index-of-refraction $\bar{n}$ of all the diffraction elements 106, FIG. 1 are similar.

Contacting face 102 is second optical medium 114 having a thickness $t_2$ in the Y direction and having an index-of-refraction $n_2$. Contacting face 104 is third optical medium 116 having a thickness $t_3$ in the Y direction and having an index-of-refraction $n_3$.

Assuming that the amount of any absorption within the diffractive subtractive color filter of FIG. 1 is negligible, a first portion of polychromatic illuminating light 118 incident on top surface 120 of second optical medium 114 at an angle $\alpha$ with respect to the normal ultimately gives rise to zero-order reflection output light 122 at an angle of reflection $\alpha$ with respect to the normal. A second portion of polychromatic light 118 incident on top surface 120 at an angle $\alpha$ with respect to the normal ultimately gives rise to zero-order transmission light 124 emerging from the bottom surface of third optical medium 116 at an angle $\alpha$ with respect to the normal.

The polarization and color characteristics of the spectra of zero-order reflection light 122 for each angle of reflection depend on the wavelength spectrum and the angle of incidence of polychromatic light 118 and on the physical parameters of the diffractive subtractive color filter shown in FIG. 1. These physical parameters include the respective values of the period d of the diffraction elements 106 and the thickness t of first optical medium 100; the respective values of the index-of-refraction $n_2$ of second optical medium 114 and $n_3$ of third optical medium 116, and the respective values of variable index-of-refraction $n(x, y)$ as a function of spatial distribution within the volume of each diffractive element 106, which respective values define the size and shape of each of regions 108, 110 and 112 and the average index-of-refraction $\bar{n}$ of each diffraction element 106. These same factors determine the color and polarization characteristics of the spectra of zero-order transmission light 124 emerging at an angle $\alpha$, relative to the normal since transmission light 124 exhibits color characteristics which in the special case of non-absorptive structures are the complement of zero-order reflection light 122.

It is known that light is an electromagnetic wave and that the properties of electromagnetic waves are defined by Maxwell's equations. It is also known that where the period d of a diffractive structure is much smaller than the wavelength of incident light, the incident light is not affected by (i.e., does not see) the diffractive structure. It is also known that where the period d of the diffractive structure is substantially larger than the wavelength of incident light, the diffractive properties of the diffractive structure can be determined, with negligible error, without resorting to Maxwell's equations by utilizing the simplifying approximations provided by Kirchhoff-Huygens wave theory. However, as is the case in the present invention, when the behavior of a diffractive structure depends upon illuminating light having a wavelength spectrum that comprises wavelengths in the general neighborhood of the period d of the diffractive structure, it is essential that Maxwell's equations be utilized to determine the properties of the diffractive structure.

Relationship (1) given previously is: $\bar{n} > \max(n_2, n_3)$. This implies that the value of the average index-of-refraction $\bar{n}$ of the diffractive structure formed by first optical medium 100 in FIG. 1 is larger than the value of the index-of-refraction $n_2$ of the second optical medium 114 contacting upper face 102 of first optical medium 100 and also is larger than the value of the index-of-refraction $n_3$ of third optical medium 116 contacting lower face 104 of optical medium 100.

Relationship (2) states:

$$d \max(n_2, n_3) < \lambda \qquad (2)$$

The effect of this constraint is to prevent (at least in a portion of the spectral range of interest and with the viewing angle being equal to an angle of incidence $\alpha = 0$) any diffraction orders other than zero order that may have been generated with first optical medium 100 from ever emerging into the ambient. Thus, all the reflected light and all the transmitted light that emerges into the ambient that has been ultimately derived from polychromatic light 118 having normal incidence (i.e., $\alpha = 0$) is comprised solely of zero-order reflection light 122 and zero-order transmission light 124.

Relationship (3) states:

$$d(\bar{n}+1) > \lambda_1 \qquad (3)$$

Since in first optical medium 100, the average index-of-refraction $\bar{n}$ is large relative to the substantially unity index-of-refraction of the ambient, the wavelength of light within first optical medium 100 will be shorter than the corresponding free-space wavelength in the ambient. Relationship (3) implies that at least for an angle of incidence $\alpha$ approaching 90° within first optical medium 100, the zero diffraction order and at least one first diffraction order can both propagate. Further, in order for both relationship (2) and relationship (3) to be true, the respective values of the free-space $\lambda$ and d must be fairly close to one another. Therefore, it is necessary to make use of Maxwell's equations to predict the optical properties of the diffractive subtractive color filter shown in FIG. 1.

Relationship (4) states:

$$t \geq \lambda 1/4n \qquad (4)$$

Relationship (4) signifies that first optical medium 100 is of sufficient thickness t to ensure that constructive and destructive interference (due to different path legnths) occurs at some wavelengths of the wavelength spectrum of the polychromatic light between those rays of light reflected from face 102 and those rays of light reflected from face 104 which ultimately combine to form zero-order reflection light 122.

The filtering characteristics of a diffractive subtractive color filter that conforms with all the above constraints depends on the specific values of its physical parameters such as $n_2$, $n_3$, the function $n(x, y)$, which determines the size and shape of each of regions 108, 110 and 112, and the physical values of t and d. In order to design a particular filter, Maxwell's equations must be solved for a selected set of these physical parameters at various relative wavelengths within a relative wavelength spectrum of $\lambda/d$. In practice, it takes a computer to perform the many calculations required to solve, by numerical analysis, Maxwell's equations for any particular set of physical parameters. Alternatively, a filter having specific values of its physical parameters can be constructed, and its reflective spectra characteristics can be measured.

As shown in FIG. 1, second optical medium 114 and third optical medium 116 comprise separate layers of material having respective thicknesses $t_2$ and $t_3$ which usually are much larger than the thickness t of first optical medium 100. The respective indices $n_2$ and $n_3$ of the material forming second optical medium 114 and third optical medium 116, while being smaller than the value of the average index-of-refraction $\bar{n}$, are generally greater than the substantially unity index-of-refraction of the ambient. However, this is not essential. In principle, at least, second optical medium 114 and/or third medium 116 could be either air or a vacuum. In this special case, polychromatic light 118 could be incident directly on face 102, so that zero-order reflection light 122 and/or zero-order transmission 124 would emerge directly from surface 102 and/or surface 104.

Figure 2:
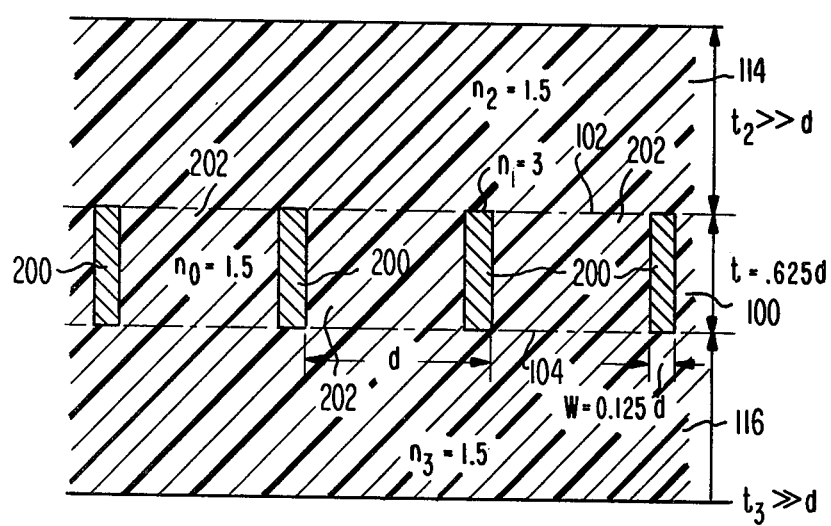
FIG. 2 illustrates one specific, geometrically simple, example of the diffractive structure shown generally in FIG. 1.

FIG. 2 shows a geometrically simple specific example of a diffractive subtractive color filter of the type shown in generalized form in FIG. 1. In the specific example of FIG. 2, first optical medium 100 is comprised of periodically spaced rectangular regions 200 composed of a material having an index-of-refraction $n_1 = 3$. These relatively high index-of-refraction regions 200 are separated by rectangular regions 202 having a relatively low index-of-refraction $n_0 = 1.5$. Both second optical medium 114 and third optical medium 116 have indices-of-refraction $n_2$ and $n_3$ also equal to 1.5. The thickness t of first optical medium 100 (which is the height of both rectangular regions 200 and 202) has the relative value of 0.625 d, where d is the spatial period of the diffractive elements formed by each pair of adjacent regions 200 and 202. The width w of each higher index-of-refraction rectangular region 200 has a relative value equal to 0.125 d. Therefore, the width of each lower rectangular region 202 has a relative value equal to 0.875 d.

The optical mediums 114 and 116 have thicknesses $t_2$ and $t_3$ which are very much larger than the spatial period d of first optical medium 100. By way of example, the value of the thickness $t_2$ may have a relative value of 37.5 d, whereas the thickness $t_3$ is assumed to be so large as to extend indefinitely.

From a theoretical standpoint, the embedded laminated grating shown in FIG. 2 is probably the geometrically simplest structure which yields the angular-dependent reflective spectra discussed above in connection with FIG. 1. In order to test the validity of the assumptions on which the present invention is based, the respective spectra of the zero-order reflected light, for the particular implementation shown in FIG. 2, were calculated on a computer for each of two angles of incidence. More specifically, the computer solved Maxwell's equations for each of four different cases, assuming in each case that wavelength spectrum $\lambda/d$ polychromatic light extended over a relative range of values of $\lambda/d$ from 1 to 2.4. The four cases were (1) an angle of incidence (with respect to the normal) of 0° with the electric E vector of the incident light assumed to be polarized parallel to the line direction of the grating (which, in FIG. 2, is in a direction perpendicular to the paper); (2) an angle of incidence of 0° (with respect to the normal) with the magnetic vector H of the incident light assumed to be polarized parallel to the line direction of the grating; (3) an angle of incidence of 20° with the electric vector E of the incident light assumed to be polarized parallel to the line direction grating, and (4) at an angle of incidence of 20° with the magnetic vector H of the incident light assumed to be polarized parallel to the line direction of the grating. The respective solutions of Maxwell's equation, in each of these four cases, for a structure having the physical parameters of FIG. 2, showed that both the electric and magnetic polarization zero-order reflection spectra are angularly dependent. Each of these reflection spectra is attained by plotting the percentage of zero-order reflection light as a function of $\lambda/d$ over the relative wavelength spectrum from 1–2.4. It was found that each of the two electric vector spectra exhibited one large reflectance peak each over a sub-interval of the $\lambda/d$ spectrum together with a plurality of much lower reflectance peaks over the remainder of the $\lambda/d$ of the wavelength spectrum. The respective positions of sub-intervals of the high reflectance peaks, in terms of the values of $\lambda/d$, and the shape of the high reflectance peaks were substantially different for the case of 0° incident polychromatic light from the case of 20° incident polychromatic light. The respective H vector spectra were composed of only relatively low reflectance peaks. However, the relative height, shape and spatial distribution of these peaks for the case of 0° incident polychromatic light were different from that of 20° incident polychromatic light. Therefore, the assumptions on which the present invention are based are valid.

Different color effects can be obtained depending upon the particular choice of the value of d. With d having a value of 0.4 micrometer ($\mu$m), the color changes from reddish to white when the angle of incidence is changed from 0° to 20°. However, with a value of d equal to 0.32 $\mu$m, the color change is from green to red when the angle of incidence changes from 0° to 20°. Further, since all the spectra contain a number of low reflectance detailed features, such as peaks and sharp band edges, these peaks and sharp band edges may be employed in an authenticating device for machine readable identification. In fact, by a proper choice of the value of d, some of the peaks or sharp end edges which occur at longer wavelengths can be made to occur in the infra-red, rather than in the visible light spectrum. Furthermore, the E vector and the H vector reflection spectra are very different from each other. This strong polarization dependence is also suited for machine identification, when the invention is utilized in an authenticating device of the type discussed above. In addition, the angular dependence about a tilt axis parallel to grating line direction is significantly different from a tilt axis perpendicular to grating line direction. This is another discriminant that can be used for machine identification.

The structure in FIG. 2 was obtained by selecting the two refractive indices $n_1 = 3$ and $n_3 = n_2 = 1.5$, then optimizing the thicknesses t and the line width w. The thickness $t_2$ and $t_3$ of the bottom and top layers are not critical as long as they are large compared to d. For best visibility of the reflective light, the bottom layer should be terminated by strongly absorbing (black) material. The given values of t and w in FIG. 2 are not the only choices of these parameters that provide good results.

While for an authenticating device, the reflective zero-order spectra are used, it should be understood that the transmission spectra, which are also produced, may be useful for other purposes.

The main benefit of the geometrically simple structure of the species as shown in FIG. 2 is that it was easy to calculate on a computer solving Maxwell's equations, in order to test the validity of the present invention. However, the structure of FIG. 2 would be most difficult (if not impossible) to physically implement in a real structure, at the present state of the art. FIG. 3 illustrates the steps of a method for fabricating geometrically more complex, but more practical, species of the present invention that have physical structures which are more easily realizable.

FIG. 3 is a flow chart showing the successive method steps for fabricating a finished filter employing the principles of the present invention, starting with a thermoplastic material 300 which may have a surface relief pattern embossed therein by a metal embossing master 302, by such known techniques as casting or hot pressing. By way of example, metal master 302 is shown as having a rectangular waveform profile of physical depth a. The first step is to emboss this waveform profile into the upper surface of thermoplastic material 300 having an index-of-refraction $n_3$. This results in the production of relief structure 304. The second step is to deposit a relatively thin layer of material 306 having an index-of-refraction of $n_1$ and having given thickness and shape characteristics on the relief surface of structure 304. Known depositing techniques includes evaporation, sputtering (particularly ion beam sputtering), spin-on techniques, etc. Material 306 is selected to have an index-of-refraction $n_1$ which is large relative to the index-of-refraction $n_3$ of thermoplastic material 300. The next step is to overcoat the deposited layer 306 on the relief surface of structure 304 with a material 308 having an index-of-refrction $n_2$, which is relatively low compared with the index-of-refraction $n_1$ of deposited layer 306. This results in a finished filter comprised of a first optical medium having a thickness t extending from the bottom of the troughs of the surface relief waveform profile in thermoplastic structure 304 to the top of the deposited layer 306 overlying the crests of this waveform profile. The first optical medium in FIG. 3 comprises those regions of theremoplastic structure 304 forming the crests of the waveform profile (index-of-refraction $n_3$), all regions of deposited layer 306 (index-of-refraction $n_1$) and those portions of the troughs of this surface relief waveform profile which are not already filled by deposited layer 306 but are filled by overcoat material 308 (index-of-refraction $n_2$). In order to meet the constraints of the present invention, it is necessary that the average index-of-refraction $\bar{n}$ of all the regions of which the first optical medium of the finished filter is comprised be larger than the value of either $n_2$ or $n_3$. The second optical medium is comprised of the remainder of overcoat 308 which lies above surface relief structure 304 and the third optical medium is comprised of the remainder of thermoplastic material 300 which lies below surface relief structure 304.

In FIG. 3, the thickness c of deposited layer 306 happens to be smaller than the physical depth a of the embossed rectangular waveform grating. This is not essential. The thickness c of the deposited layer 306 may be larger than the depth a of the embossed rectangular waveform grating. In this latter case, the configuration of the finished filter in FIG. 3 would have the appearance shown in FIG. 3a, rather than that of the finished filter actually shown in FIG. 3.

FIG. 3b, in idealized form, shows a particular example of the species of the present invention represented by the finished filters of FIGS. 3 and 3a. As indicated in FIG. 3b, the relatively high index-of-refraction of $n_1$ of the deposited layer 306 is equal to 3; the relatively low indices-of-refraction of $n_2$ and $n_3$ are both 1.5; the rectangular waveform period d has a 50% aspect ratio or duty-cycle (i.e., it is a square wave); the thickness c of deposited layer 306 has the relative value 0.22 d and the distance between the top of the deposited layer 306 lying within a trough of the waveform and the bottom of deposited layer 306 lying above a crest of the deposited waveform has a relative value 0.055 d. Therefore, the depth a of the square-wave profile is 0.275 d (the sum of 0.22 d and 0.055 d). A computer programmed to solve Maxwell's equations for the particular configuration and values of parameters shown in FIG. 3b, calculated the zero-order reflection spectra shown in FIGS. 3c, 3d and 3e for various angles of incidence of polychromatic light over wavelength spectrum extending over a relative range of values $\lambda/d$ from 1–2.5. FIG. 3c shows both the E vector zero-order reflection spectrum and the H vector reflection spectrum for an angle of incidence of 0° with respect to the normal, while, FIGS. 3d and 3e show these reflection spectra for 20° and 40°, respectively, relative to the normal. As shown in FIG. 3c, at zero angle of incidence, the zero-order reflection spectrum for the E vector exhibits a large single peak. The position of the sub-interval of the relative wavelength spectrum at which this single peak appears is in accordance with relationship 4, discussed above. Specifically, the peak only occurs over a sub-interval of relative wavelengths $\lambda/d$ which lie in the spectral range of interest $\lambda_1 < \lambda < \lambda_2$ substantially equal to the maximum value of $n_2$ or $n_3$ (which in the case of FIG. 3b is 1.5). As stated earlier in connection of FIG. 2, the H vector polarization in each of FIGS. 3c, 3d and 3e contributes relatively little to the overall reflectance, but contains features, such as narrow, sharp peaks suitable for a machine identification.

More generally, the width of the single large peak at 0° (such as the large peak in FIG. 3c) increases with increasing refractive index of the deposition material $n_1$ and increasing deposition thickness c. A peak reflectance close to 100 can usually be obtained for any given type of grating profile by tuning its depth value, and/or its deposition thickness value. As shown in FIG. 3c, the large peak of the E vector polarization meets all the above criteria. In addition, the E vector polariziation shows a relatively weak reflection peak at a value of $\lambda/d$ in the vicinity of unity and the H vector polarization shows a relatively sharp reflection peak at a value of $\lambda/d$ in the vicinity of 1.52.

As indicated in FIGS. 3d and 3e, the reflection spectrum splits into two peaks moving symmetrically towards shorter and higher wavelengths respectively for angles of incidence which are oblique with respect to an axis (perpendicular to the plane of the paper) parallel to the grating lines. The amount of wavelength shift from the original position at $\alpha=0°$ is of the order of $d\alpha$. However, at oblique angles with respect to an axis perpendicular to the grating lines, a much weaker shift towards shorter wavelengths results with no associated peak splitting. This weaker shift is similar to the $\cos \alpha$ dependent in shift observed in conventional interference filter structures.

By a proper choice of the grating period d, the peak for $\alpha=0$ can be placed in the red. Then, the sequence is green, then blue for typical shifts to $\alpha=15°$, then 30° (parallel to the grating lines). However, if the grating period d is chosen so that, at $\alpha=0$, the peak is located in the green, a typical shift produces magenta. Finally, if the grating period d is chosen so that, at $\alpha=0$, the peak is located in the blue, a typical shift causes the color changes to green and then to red. This description of color change is somewhat simplified, since the particular structure, such as the particular structure shown in FIG. 3b, exhibits its own specific spectral signature (which includes, in the case of FIG. 3b the effect of the middle-sized additional E and H vector polarization peaks shown in FIGS. 3c and 3d).

Typical values of the grating period d are from 0.1 to 0.45 μm and typical grating depths a are from 0.1 to 0.2 μm, when λ is in the visible wavelength spectrum of 0.4–0.7 μm. The refraction index of the deposition material is usually in the range from 1.7–5. In practice, the index-of-refraction $n_1$ depends on λ and may be complex (for absorptive materials), thus introducing a further variability in design of the filter.

In FIG. 3, it is assumed that deposition takes place perfectly normal to the surface of the relief structure, so that the thickness of deposition on all the bottoms and on all the tops of the rectangular waveform profile are all equal to one another. In practice, such perfect deposition can only be approached, but not reached, by practical deposition techniques, such as evaporation or ion beam sputtering, directed normal to the surface of the relief structure. The result is that, in practice, the method of FIG. 3 tends to result in a finished filter having a configuration that looks more like FIG. 4, than either like, FIG. 3 or FIG. 3a. The main difference between the configuration of FIG. 4 and those of FIGS. 3 and 3a is that the thickness of deposited material 306 overlying the troughs of the rectangular waveform relief structure 304 is substantially larger than the thickness overlying the crests of this rectangular waveform profile.

FIG. 4a shows, in idealized form, a specific example of a configuration which approximates the configuration of FIG. 4. In FIG. 4a, the value of relatively high index-of-refraction $n_1$ of deposited material 306 is 2.3 and the indices-of-refraction $n_2$ and $n_3$ of structure 304 and overcoat 308 are 1.5. As indicated in FIG. 4a, the boundary between structure 304 and deposited layer 306 forms a square-wave profile having a period d and a relatively high amplitude of 0.3 d. The boundary between overcoat 308 and deposited layer 306 forms a square-wave profile having a period d and a relatively low amplitude of 0.1 d. Further, the troughs of this relatively low amplitude square-wave are situated at a distance of 0.1 d above the crests of the relatively high amplitude square-wave. Therefore, in the case of FIG. 4a, the overall thickness t of the first optical medium is 0.5 d.

FIGS. 4b and 4c respectively, show the zero-order reflection spectrum for angles of incidence and of 0° and 30°, computed by solving Maxwell's equations for a filter having the configuration and physical parameters shown in FIG. 4a. The similarities and differences between the zero-order reflection spectra shown in FIGS. 4b and 4c, on one hand, and those shown in FIGS. 3c, 3d and 3e, on the other hand, should be noted. More specifically, the main feature, shown in FIG. 4b, is that, for 0° the strong E vector has a reflection peak relative value for λ of about 1.8 d. As shown in FIG. 4c, for 30° incidence, this peak splits into two peaks at a relative value of λ equal to approximately 1.38 d and apporximately 2.25 d. This is in agreement with the general principles discussed above in connection of FIGS. 3c, 3d and 3e. In addition, when the angle of incidence is 30°, a third peak in the E vector polarization spectrum is observed at a relative value of λ of about 1.08 d, as shown in FIG. 4c. The H vector polarization spectrum for an angle of incidence of 0°, shown in FIG. 4b, is almost featureless. However, at an angle of incidence of 30°, as shown in FIG. 4c, a complicated spectrum with several sharp resonances develops. It is obvious that these sharp peaks are ideally suited for machine identification.

The deposition of the deposited layer 306 need not be made normal to the relief surface of structure 304. FIG. 5 illustrates a configuration of the finished filter in which the layer 306 is deposited at a relatively large oblique angle (i.e., about 45°) with respect to the relief surface of structure 304. Such an angular deposition may be accomplished by evaporation or ion beam sputtering from an angularly displaced source. FIG. 5a shows, in idealized form, a specific example of the structure shown in FIG. 5. In FIG. 5a, the relatively high index-of-refraction $n_1$ of deposited material 306 is 3 and the respective indices-of-refraction $n_2$ and $n_3$ of structure 304 and overcoat 308 are 1.5. In FIG. 5a, an L-shaped deposit of material 306 occurs periodically, with a period d, at a spacing therebetween of 0.5 d. The width and height of the horizontal leg of each L-shaped deposit of material 306 are 0.5 d and 0.25 d, respectively. The width and height of the vertical leg of each L-shaped deposit of material 306 are 0.18 d and 0.2 d, respectively. The dimensions shown in FIG. 5a approximate those which would be obtained using the method of FIG. 3, with an angle of evaporation for deposited material 306 of about 35°.

One of the benefits of the configuration shown in FIGS. 5 and 5a, when employed in an authenticating device, is that it belongs to a class, along with the configuration of FIG. 3, of particularly secure structures where each individual grating line is fully encapsulated by the host material. This encapsulation prevents the possibility that deposited layer might be peeled off to reveal the physical structure of the grating.

FIGS. 5b and 5c respectively, show the zero-order reflection spectra for 0° and for 20° of a filter having the physical parameters of the configuration shown in FIG. 5a, as calculated from Maxwell's equations by a computer. As shown in FIG. 5b, the calculated E vector polarization spectrum for 0° has bandpass characteristic with very sharp edges, suitable to produce good colors. The H vector polarization is characterized by two sharp peaks. As shown in FIG. 5c, at 20°, the two shifted peaks, at relative values of λ about equal to 1.6 d and about 2.3 d have very much reduced intensity and do not produce a strong color effect. While this reduced intensity is in contrast to the previous examples, a useful application of this reduced intensity property would be to put printed information on the back side of a structure which would not be visible for small viewing angles, near 0°, but could be seen and read at larger angles, near 20°.

Numerous structures have been fabricated. Mainly these structures had the configurations shown in FIG. 3, FIG. 3a and FIG. 4. One such structure, which had a configuration shown in FIG. 4 (or approximately in FIG. 4a) was made by first forming a square-wave surface relief structure (d=0.38 μm, and =0.12 μm) in photoresist, using lithographic techniques; then depositing ZnS(t=0.12 μm) by vapor deposition. Finally, the device was covered with an ultra-violet curable epoxy. No hot pressing or casting technique was involved, since the fabrication was experimental and at this stage no mass production was intended. The physical parameters employed corresponded closely to those chosen for the numerical calculation by computer of FIG. 4a, discussed above. FIGS. 6a and 6b, respectively, show the zero-order reflection spectra toward 0° and 30° obtained experimentally from this fabricated structure. Good qualitative agreement is observed between the computed spectra shown in FIGS. 4b and 4c and the corresponding experimental spectra shown in FIGS. 6a and 6b. All the main peaks discussed above in connection with FIGS. 4a and 4b can be found and compared, although their intensity and exact positions in FIGS. 6a and 6b vary slightly.

So far in this discussion, the surface relief of structure 304 has always had a rectangular waveform profile. This need not be the case. FIG. 7 shows a species of the present invention in which the surface relief of structure 304 has a triangular waveform. Further, as shown in FIG. 7, deposited layer 306 is deposited at an oblique angle, in a manner similar to that discussed in connection with FIG. 5, to cover only one of the two exposed sides of the triangular waveform.

All of the configurations shown in FIGS. 2-7 are species of the filter shown in FIG. 1. These species should be considered merely as illustrative examples of the present invention. Any other configuration, not shown, that conforms to the constraints discussed above in connection with FIG. 1, are within the purview of the present invention. Actually, an infinite number of different grating structures can be made, depending upon the particular choice of relief structure, materials, deposition thickness, etc.

All the structures described herein are extremely hard to counterfeit, even when it is assumed that the counterfeiter has large capital and technical resources available. This is due to at least to two facts. First, it is virtually impossible to investigate the geometry of a given structure by optical (non-destructive) means. Although it is possible to calculate the optical properties of a given structure, the inverse problem exceeds present day computing capability. Second, a mechanical or chemical analysis of a given structure is very hard, if not impossible, due to its fineness, with typical dimensions in the sub-micrometer range. In particular, structures, such as those shown in FIGS. 3, 5 and 7, are extremely difficult to separate for analysis because the deposition material is separated into discrete lines fully enclosed by the surrounding materials. Further, the first step of the method shown in FIG. 3 uses the surface relief pattern of a master to reproduce the surface relief pattern in many replicas of the master. Since the same master is used over and over to make replicas, the process inherently gives high reproducibility and cannot be easily copied, unless someone has access to this original master.

Since filter structures of the present invention meet all the requirements for an authenticating device of the type described in the aforementioned co-pending patent application, and, in addition, are so extremely hard to counterfeit, a filter structure incorporating the present invention is particularly suitable for use as such an authenticating device.

FIGS. 8 and 9 are similar to figures of the aforementioned co-pending patent application. As shown in FIG. 8, one or more authenticating devices, such as authenticating device 800, may be bonded to an authenticated item 802 comprised of sheet material, as discussed more fully in the aforesaid co-pending patent application. Authenticating device 800 may comprise a filter structure incorporating the present invention. One example of such an authenticating device 800 is shown in FIG. 9.

In FIG. 9, authenticating device 800 is comprised of a first area 900 having a dimension W surrounded by a second area 902. Area 900 may be made of a first diffractive structure incorporating the principles of the present invention which provides zero-order reflection light having a first color hue (such as red) when viewed in diffuse polychromatic light at a 0° angle with respect to the normal to the surface of authenticating device 800. Area 902 may be comprised of a second diffractive structure incorporating the principles of the present invention which provides zero-order reflection light of a second contrasting color hue (such as green) when viewed in diffuse polychromatic light at a 0° angle with respect to the normal to the surface of authenticating device 800. When authenticating device 800 (usually together with authenticating item 802) it tilted so that it is viewed at an oblique angle of incidence, the first color hue, such as red of area 900 may change to green, while, at the same time, the second color hue, such as green, of area 902 may change to magenta. The size of the dimension W of area 900 is at least sufficiently large so that ara 902 may be easily seen at normal viewing distances, such as 30 centimeters.

In an authenticating device, as well as other articles of manufacture, various attributes of the present invention may be combined to advantage. For instance, the grating lines in one area such as area 900, may be oriented at a different angle from the grating lines of a different area, such as area 902. Further, some areas could employ overlapping grating lines of different periodicities d and/or of different angular orientations. The fact that angular discrimination of spectra differs marked between tilting about an axis parallel to grating lines and tilting about an axis perpendicular to grating lines can be made use of in an authenticating device, as well as other articles of manufacture. Making use of the principles of the present invention, it is possible to produce character text in a manner such that it is discernable from the background only under certain viewing conditions and not for other viewing conditions. In this regard, a focused laser beam may be employed to write text characters by selectively destroying portions of a diffractive structure surface that had been fabricated in accordance with the principles of the present invention.

What is claimed is:

1. A diffractive subtractive color filter responsive to polychromatic illuminating light having a given wavelength spectrum incident thereon for deriving reflection spectra which vary as a function of the angle of incidence $\alpha$ of said illuminating light and in which for each angle of incidence the reflection spectrum comprises separate portions that are polarized respectively parallel to and perpendicular to a given direction, and for also deriving transmission spectra which are substantially the complement of said reflection spectra; said filter comprising:

a first optical medium having a thickness t between two opposite faces thereof, said first optical medium having a varying index-of-refraction which divides said first optical medium into juxtaposed periodic diffraction elements of a diffractive structure having a period d which extends in a direction substantially parallel to said faces and perpendicular to said given direction, so that each one of said diffraction elements extends along a direction substantially parallel to said faces and parallel to said given direction, the spatial distribution of said varying index-of-refraction within the volume of each diffraction element dividing that diffraction element into a plurality of separate three-dimensional regions of certain-valued relatively higher and relatively lower indices-of-refraction, each of said regions having a specified size and shape, whereby the entire volume of each diffraction element has an average index-of-refraction $\bar{n}$, said average index-of-refraction $\bar{n}$ being larger than the index-of-refraction $n_2$ of a second optical medium contacting one of said opposite faces and also larger than the index-of-refraction $n_3$ of a third optical medium contacting the other of said opposite faces, and at all free space wavelengths $\lambda$ within a sub-interval of said illuminating wavelength spectrum extending from a minimum wavelength $\lambda_1$ up to a maximum wavelength $\lambda_2$, the following relationships are true $$\bar{n} > \max(n_2, n_3) \quad (1)$$

$$d \max(n_2, n_3) < \lambda_2 \quad (2)$$

$$d(\bar{n}+1) > \lambda_1 \quad (3)$$

$$4\bar{n}t \geq \lambda_1 \quad (4)$$

where $\max(n_2, n_3)$ is generally the larger of $n_2$ and $n_3$, but in the special case where $n_2 = n_3$, is $n_2$ or $n_3$, whereby the characteristics of each of said spectra depends on (1) the angle of incidence of said illuminating light, (2) the specified size and shape of each of said regions of said certain-valued relatively higher and relatively lower indices-of-refraction, so that the value of $\bar{n}$ is determined, and (3) the respective physical values of d and t.

2. The diffractive subtractive color filter defined in claim 1, wherein at least the free space wavelengths of said sub-interval of the wavelength spectrum of said polychromatic illuminating light includes free space wavelengths within the range of 0.4–0.7 micrometer of visible light.

3. The diffractive subtractive color filter defined in claim 2,
wherein the value of the angle $\alpha$ is between 0° and 90° with respect to a plane normal to said faces and parallel to said given direction.

4. The diffractive subtractive color filter defined in claim 1,
wherein the value of the angle $\alpha$ is between 0° and 90° with respect to a plane normal to said faces and parallel to said given direction.

5. The diffractive subtractive color filter defined in claim 1, further including said second optical medium and said third optical medium,
wherein said second optical medium is comprised of a solid material laminated to said one of said opposite faces of said first medium,
wherein said third optical medium is comprised of a solid material laminated to said other of said opposite faces of said first medium, and
wherein the index-of-refraction $n_2$ of the solid material of which said second optical medium is composed and the index-of-refraction $n_3$ of the solid material of which said third optical medium is composed are both larger than unity.

6. The diffractive subtractive color filter defined in claim 5,
wherein each diffractive element of said first optical medium includes at least one first region comprised of a solid material having an idex-of-refraction $n_1$ larger than either $n_2$ or $n_3$, at least one second region contacting said second optical medium that is composed of the same solid material as said second optical medium, and at least one third region contacting said third optical medium that is composed of the same solid material as said third optical medium.

7. The diffractive subtractive color filter defined in claim 6, wherein said second and third optical mediums are composed of the same solid material, whereby $n_2$ is equal to $n_3$.

8. The diffractive subtractive color filter defined in claim 6, wherein said first region contacts both said second region and said third region.

9. The diffractive subtractive color filter defined in claim 8, wherein said second region contacts said third region.

10. The diffractive subtractive color filter defined in claim 9, wherein said second and third optical mediums are composed of the same solid material, whereby $n_2$ is equal to $n_3$.

11. The diffractive subtractive color filter defined in claim 8, wherein said first region is situated in between said second and third regions and completely separates said second region from said third region so that there is no contact between said second and third regions.

12. The diffractive subtractive color filter defined in claim 6,
wherein said third optical medium and all third regions of said first optical medium are comprised of a diffraction grating formed by a given periodic waveform having said period d and a given amplitude a embossed as a surface relief pattern in a solid material having said index-of-refraction $n_3$,
wherein all said first regions of said first optical medium are comprised of solid material having said index-of-refraction $n_1$ deposited on at least a portion of said surface relief pattern, said deposited material having predetermined thickness and shape characteristics, and
wherein said second optical medium and all said second regions of said first optical medium are comprised of an overcoat of solid material having said index-of-refraction $n_2$ which covers said surface relief pattern and said deposited material, said overcoat filling in all those portions of said first optical medium not occupied by said first and third regions.

13. The diffractive subtractive color filter defined in claim 12, wherein the ratio of the index-of-refraction $n_1$ to the larger of the indices-of-refraction $n_2$ and $n_3$ is at least 1.5.

14. The diffractive subtractive color filter defined in claim 12, wherein both the indices-of-refraction of $n_2$ and $n_3$ have a value of substantially 1.5,
wherein the index-of-refraction of $n_1$ has a value in the range of 1.7–5,
wherein the period d of said periodic waveform has a value in the range of 0.1–0.45 micrometer, wherein the amplitude a of such periodic waveform has a value in the range of 0.1–0.2 micrometer, and wherein the wavelength spectrum of said polychromatic illuminating light includes free space wavelengths within the range of 0.4–0.7 micrometer of visible light.

15. The diffractive subtractive color filter defined in claim 12, wherein said periodic waveform of said diffraction grating is a rectangular waveform.

16. The diffractive subtractive color filter defined in claim 15, wherein said first regions are comprised of respective layers of said deposited material covering respectively the crests and the troughs of said rectangular waveform.

17. The diffractive subtractive color filter defined in claim 16, wherein said deposited layer covering said crests and covering said troughs of said rectangular waveform both have substantially the same thickness c.

18. The diffractive subtractive color filter defined in claim 17, wherein the value of c is smaller than the value of a.

19. The diffractive subtractive color filter defined in claim 17, wherein the value of c is larger than the value of a.

20. The diffractive subtractive color filter defined in claim 16, wherein the deposited layer covering the troughs of said rectangular waveform has a thickness which is larger than the thickness of the deposited layer covering said crests but is smaller than the sum of the amplitude a of said rectangular waveform and the thickness of the deposited layer covering the crests of said rectangular waveform.

21. The subtractive diffractive color filter defined in claim 15, wherein said first regions are comprised of L-shaped layers of said deposited material that cover the crests and a certain one of the two sides of said rectangular waveform, the deposited layers covering said crests and covering said certain one of the two sides of said rectangular waveform having respective thicknesses.

22. The subtractive diffractive color filter defined in claim 12, wherein said predetermined waveform of said diffraction grating is a triangular waveform.

23. The diffractive substractive color filter defined in claim 21, wherein said first regions are comprised of layers of deposited material covering a certain one of the sides of said triangular waveform.

24. A method for utilizing a diffractive subtractive filter comprising a first optical medium having a thickness t between two opposite faces thereof, said first optical medium having a varying index-of-refraction which divides said first optical medium into juxtaposed periodic diffraction elements of a diffractive structure having a period d which extends in a direction substantially parallel to said faces and perpendicular to a given direction, so that each one of said diffraction elements extends along a direction substantially parallel to said faces and parallel to said given direction, the spatial distribution of said varying index-of-refraction within the volume of each diffraction element dividing that diffraction element into a plurality of separate three-dimensional regions of certain-valued relatively higher and relatively lower indices-of-refraction, each of said regions having a specified size and shape, whereby the entire volume of each diffraction element has an average index-of-refraction $\bar{n}$, said average index-of-refraction $\bar{n}$ being larger than the index-of-refraction $n_2$ of a second optical medium contacting one of said opposite faces and also larger than the index-of-refraction $n_3$ of a third optical medium contacting the other of said opposite faces, and at all free space wavelengths $\lambda$ within at least a sub-interval extending from a minimum wavelength $\lambda_1$ up to a maximum wavelength $\lambda_2$ of the visible spectrum between 0.4–0.7 micrometer, the following relationships are true for all angles of incidence of visible illuminating light in a range between zero and $\alpha$ with respect to a plane normal to said faces and parallel to said given direction:

$$\bar{n} > \max(n_2, n_3) \quad (1)$$

$$d \max(n_2, n_3) < \lambda_2 \quad (2)$$

$$d(\bar{n} + 1) > \lambda_1 \quad (3)$$

$$4\bar{n}t \geq \lambda_1 \quad (4)$$

where $\max(n_2, n_3)$ is generally the larger of $n_2$ and $n_3$, but, in the special case where $n_2 = n_3$, is $n_2$ or $n_3$;

said method including the steps of:
(a) illuminating said filter with diffuse polychromatic visible light which includes said wavelengths extending from $\lambda_1 > \lambda > \lambda_2$ of said sub-interval;
(b) viewing a first color hue of the light reflected from said filter at a first given value of angle $\alpha_1$ in a range between zero and $\alpha$, and
(c) viewing a second color hue different from said first color hue of the light reflected from said filter at a second given value of angle $\alpha_2$ in said range between zero and $\alpha$ which is different from said first given value of angle $\alpha_1$.

25. The method defined in claim 24, wherein $\alpha$ has a value of 90°, and
wherein step (b) comprises the step of viewing said first color hue at a first given value of angle $\alpha_1$ in a range between 0° and 90°, and step (c) comprises the step of viewing said second color hue at a second given value of angle $\alpha_2$ in said range between 0° and 90°.

26. The method defined in claim 24,
wherein step (a) comprises illuminating said filter with diffuse white light having a wavelength spectrum extending from 0.4–0.7 micrometer.

27. The method defined in claim 26, wherein $\alpha$ has a value of 90°, and
wherein step (b) comprises the step of viewing said first color hue at a first given value of angle $\alpha_1$ in a range between zero and 90°, and step (c) comprises the step of viewing said second color hue at a second given value of angle $\alpha_2$ in said range between zero and 90°.

28. An article comprising an authenticated item of sheet material which is subject to counterfeiting and an authenticating device bonded to said item, wherein said device includes:

a substrate bonded to said sheet material, said substrate being composed of a material having an index-of-refraction $n_3$, said substrate having a diffractive structure including at least one diffraction grating embossed as a surface relief pattern on an area of the viewable surface of said substrate, each diffraction grating having a line direction formed by a given periodic waveform having a period d perpendicular to said line direction and a given amplitude a embossed in said viewable surface, a solid material having an index-of-refraction $n_1$ larger than $n_3$ deposited on at least a given portion of each period of each embossed diffraction grating, said deposited material on said given portion of each period having the same predetermined thickness and shape characteristics such that a maximum overall thickness of size t of such diffraction grating in a direction normal to said viewable surface is formed by the sum of the amplitude a of that embossed diffraction grating and the thickness of said deposited material of that diffraction grating, and an overcoat composed of a solid material having an index-of-refraction $n_2$, smaller than $n_1$, which covers said relief pattern and said deposited material, said overcoat filling in all of the space within said overall thickness t of each diffraction grating not already occupied by said substrate material or by said deposited material, wherein at all free space wavelengths $\lambda$ within a sub-interval extending from a minimum wavelength $\lambda_1$ up to a maximum wavelength $\lambda_2$ of visible illuminating light having a wavelength spectrum within 0.4–0.7 micrometer, the following relationships are true for all angles of incidence of said illuminating light in a range between zero and $\alpha$ with respect to a plane normal to said variable surface and parallel to said line direction:

$$\bar{n} > \max(n_2, n_3) \tag{1}$$

$$d \max(n_2, n_3) < \lambda_2 \tag{2}$$

$$d(\bar{n} + 1) > \lambda_1 \tag{3}$$

$$4\bar{n} t \geq \lambda_1 \tag{4}$$

where $\bar{n}$ is the average index-of-refraction of the substrate material, the deposited material and the overcoat material within the volume of the space occupied by the overall thickness t of each diffraction grating, and where $\max(n_2, n_3)$ is generally the larger of $n_2$ and $n_3$, but, in the special case where $n_2 = n_3$, is $n_2$ or $n_3$, whereby the polarization and color characteristics of the spectra of the reflected light from each diffraction grating of said authenticating device viewed at a viewing angle between zero and $\alpha$ is determined by the value of the viewing angle and by the set of parameters including (1) the values of the indices-of-refraction $n_1$, $n_2$ and $n_3$, (2) the given waveform of that diffraction grating (3) the predetermined thickness and shape characteristics of the deposited material of that diffraction grating and (4) the respective physical values of the period d, the amplitude a and the overall thickness t of that diffraction grating.

29. The article defined in claim 28, wherein the value of $\alpha$ is 90°.

30. The article defined in claim 28, wherein said diffractive structure includes a first of said diffraction gratings occupying a first portion of the area of said diffractive structure and a second of said diffraction gratings occupying a second portion of the area of said diffractive structure, and wherein at least one of said parameters of said first of said diffraction gratings is substantially different from that of said second of said diffraction gratings, thereby to provide substantially different polarization and color characteristics of the spectra of the reflected light from said first and second diffraction gratings for all viewing angles between zero and $\alpha$.

31. The article defined in claim 30, wherein said first and second portions of the area of said diffractive structure are contiguous with one another.

32. The article defined in claim 31 wherein said second portion of the area surrounds the first portion of the area of said diffractive structure.

33. The article defined in claim 30, wherein said at least one parameter is the value of d.

* * * * *

UNITED STATES PATENT AND TRADEMARK OFFICE
CERTIFICATE OF CORRECTION

PATENT NO. : 4,484,797
DATED : November 27, 1984
INVENTOR(S) : KNOP ET AL.

It is certified that error appears in the above-identified patent and that said Letters Patent is hereby corrected as shown below:

Column 3, line 8, "n" should be --$\bar{n}$--

Column 4, line 39, "'free/space wavelength'" should be --"free space wavelength"--

Column 6, line 50, "legnths" should be --lengths--

Column 8, line 3, "Maxwell s" should be --Maxwell's--

Column 10, line 38, "100" should be --100%--

Column 11, line 62, "apporximately" should be --approximately--

Column 12, line 16, "index-of-refration" should be --index-of-refraction--

Column 12, line 60, after "and" insert --$\underline{a}$--

Column 13, line 20, change "configuations" to --configurations--

Column 18, line 21, "$\lambda_1 > \lambda > \lambda_2$" should be --$\lambda_1 < \lambda < \lambda_2$--

Signed and Sealed this

Twenty-eighth Day of May 1985

[SEAL]

Attest:

DONALD J. QUIGG

Attesting Officer    Acting Commissioner of Patents and Trademarks